United States Patent [19]

Smith et al.

[11] 3,848,626
[45] Nov. 19, 1974

[54] MEANS FOR COUPLING FLUID CONTROL COMPONENTS IN FLUID LINES

[75] Inventors: Leslie William Smith, Shipston-on-Stour; Michael John Wates, Bishampton; Robert John Tait, Shipston-on-Stour, all of England

[73] Assignee: C. A. Norgren Co., Littleton, Colo.

[22] Filed: July 19, 1973

[21] Appl. No.: 380,885

[30] Foreign Application Priority Data

July 18, 1972 Great Britain................... 33500/72

[52] U.S. Cl............. 137/269, 137/271, 137/561 R, 137/608, 137/798, 285/173 R
[51] Int. Cl............................................ F16k 11/10
[58] Field of Search........ 137/561 R, 608, 269, 271, 137/613, 635, 798; 285/173 R; 251/368, 148, 151, 152

[56] References Cited
UNITED STATES PATENTS

| | | |
|---|---|---|
| 3,506,029 | 4/1970 | Demler, Sr. et al............ 137/561 R |
| 3,556,147 | 1/1971 | Sizer................................... 137/608 |
| 3,572,366 | 3/1971 | Wiggins.......................... 137/608 X |
| 3,580,615 | 5/1971 | Prosser...................... 285/137 R X |
| 3,589,387 | 6/1971 | Raymond....................... 137/608 X |
| 3,654,960 | 4/1972 | Kiernan .......................... 137/271 X |
| 3,719,199 | 3/1973 | Mentink............................... 137/269 |
| 3,741,236 | 6/1973 | Pass et al............................ 137/269 |

Primary Examiner—William R. Cline
Attorney, Agent, or Firm—Sheridan, Ross & Fields

[57] ABSTRACT

Apparatus for supporting and connecting fluid control and/or conditioning units such as air filters, lubricators and pressure regulators to permit flow of fluid through such units in series. The apparatus is of a kind employing supporting frames in which the units can be inserted to bring inlet and outlet ports of the units into sealed registration with peripheral openings in the frames. To enable frames to be connected in series into a fluid line without the need to interpose a linking conduit, insert components are provided for insertion through peripheral openings of the different frames. When the frames are assembled in series these insert components co-operate to provide a fluid path from a unit in one frame to a unit in the next frame.

9 Claims, 8 Drawing Figures

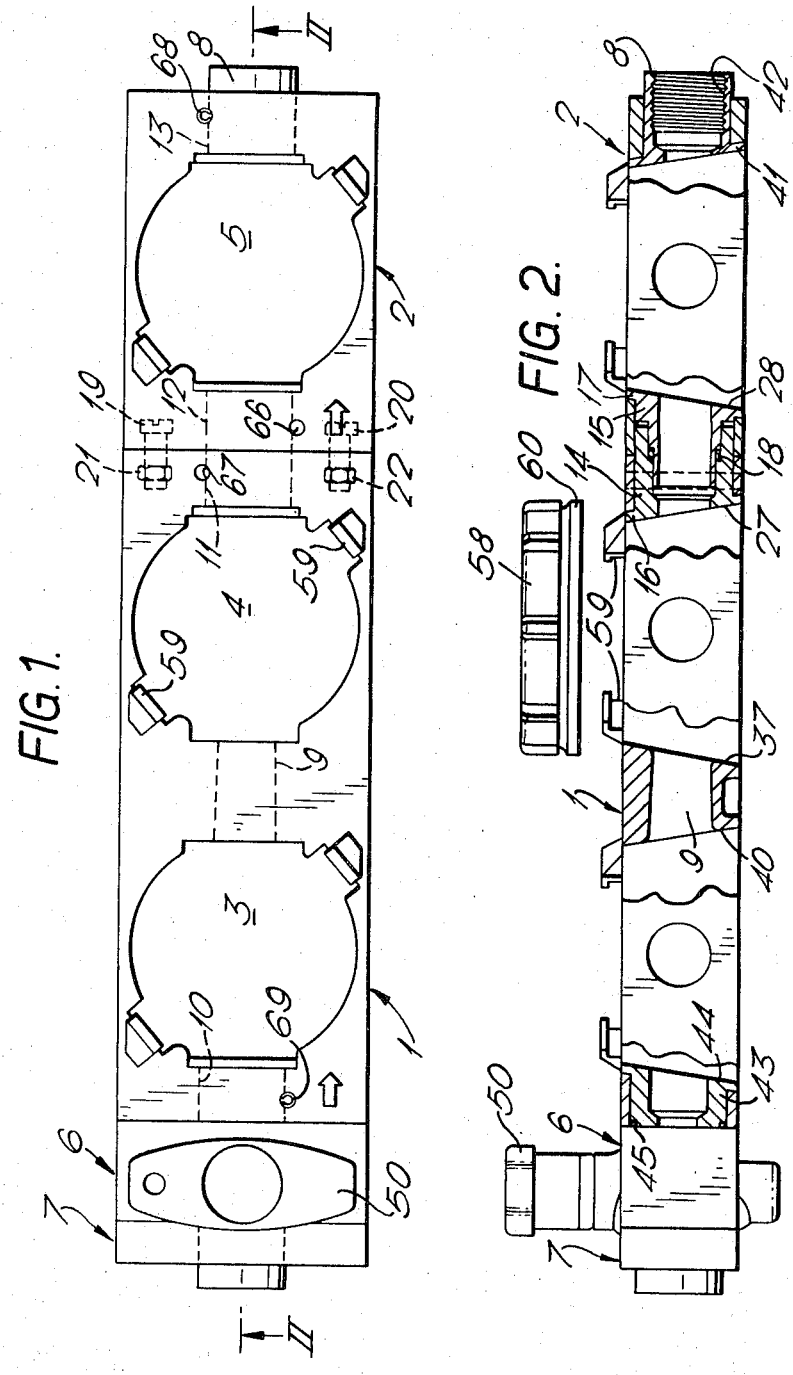

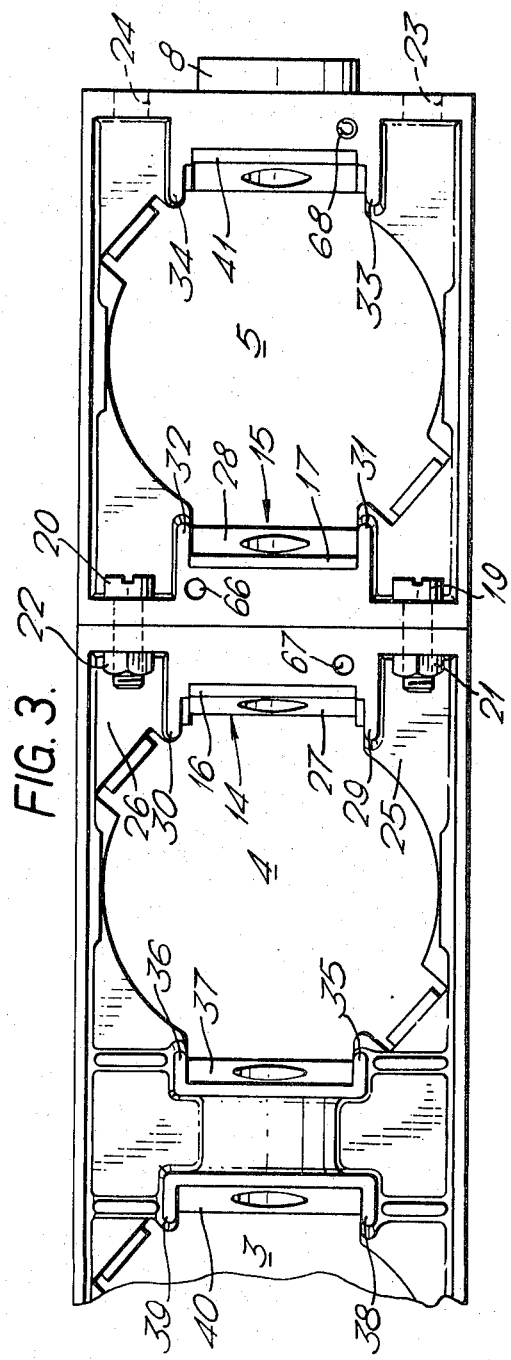
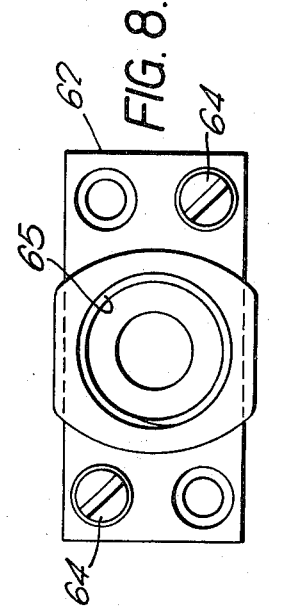
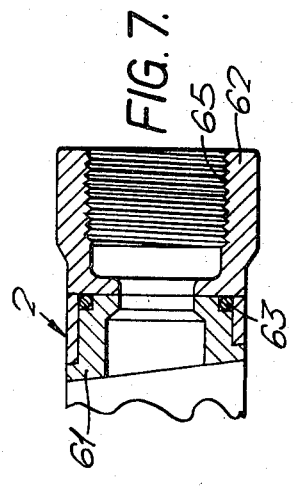

MEANS FOR COUPLING FLUID CONTROL COMPONENTS IN FLUID LINES

This invention relates to apparatus for supporting and connecting fluid control and/or conditioning units to permit flow of fluid through such units in series, said apparatus comprising at least one pair of frames each capable of supporting at least one said unit in a position such that fluid inlet and outlet ports of such unit are within the frame, and each of such frames having local peripheral openings via which fluid can flow to and from a unit or units located in the frame.

In a fluid line such as a compressed air line, it is often necessary to provide various fluid control and/or conditioning units. For example, there may be a control unit in the form of a valve or pressure regulator and/or a conditioning unit such as a filter or lubricator. Such units may be used singly or in different combinations. In some cases a single unit combines different functions, e.g., filtration and pressure regulation.

If fluid control and/or conditioning units are designed for direct connection into a fluid line, manufacturing and stocking difficulties are encountered. This is because the diameter of the conduits forming the fluid line and the diameter and type of screw thread or other couplings on the conduits to which the units have to be fitted vary considerably from one installation to another. When such direct connections are used it is moreover not possible to remove and replace a unit very rapidly.

In order to permit standard fluid control and/or regulating units to be installed in conduits of different diameters, use can be made of supporting frames with peripheral openings via which fluid can pass into the frames, the latter being adapted to receive the units so that sealing faces around the inlet and outlet ports thereof are disposed in fluid-tight engagement with sealing faces at the interior of the frame.

A said unit-supporting frame may be constructed to receive a plurality of units for flow of fluid through the units in series. Thus a given frame may be formed with a plurality of unit-receiving apertures interconnected by fluid passages within the frame. However problems or disadvantages sometimes exist in making supporting frames large enough to receive the number of components required to be grouped together. Manufacturing problems exist in particular when making large frames in the form of metal castings. Moreover such large frames may be required by only a limited number of customers and they cannot be used in situations where a smaller number of fluid control and/or conditioning units are to be installed. On the other hand if only small frames are available, e.g., frames for receiving and supporting only one or two units per frame, and it becomes necessary to install a larger number of units in the fluid line, it is necessary to apportion the units between two or more frames and to couple the frames in series into the fluid line. The necessity of linking a number of frames by screw coupling them to intervening sections of conduit detracts at least to some extent from the advantage of using the frames. In particular the installation of the apparatus becomes more complicated and it takes up more space and cannot so easily be secured to a mounting panel or other structure.

It is an object of the present invention to provide apparatus incorporating frames for supporting and connecting fluid control and/or conditioning units, which frames can be used in combination without having to screwcouple them to intervening conduit sections. Another object is to provide a said apparatus wherein the frames are combinable to form a unitary frame structure.

According to the present invention, there is provided apparatus for supporting and connecting fluid control and/or conditioning units to permit flow of fluid through such units in series, said apparatus comprising at least one pair of frames each capable of supporting at least one said unit in a position such that fluid inlet and outlet ports of such unit are within the frame, and each of such frames having local peripheral openings via which fluid can flow to and from a unit or units located in the frame, characterised in that the apparatus includes at least one pair of tubular insert components which are insertable through two said peripheral openings, one in one frame and one in the other frame of the or a said pair, said insert components having sealing faces for co-operating with sealing faces of fluid control and/or conditioning units in such frames and being adapted to co-operate to provide a fluid path from a unit in one frame to a unit in the other frame.

By means of such apparatus a series of units exceeding in number the capacity of any individual frame can be supported by means of a combination of frames and without the necessity to screw the frames to intervening conduit sections. When it is required to use more than one frame, it is merely necessary to locate the insert components in the frames and to secure the frames in association with each other so that the insert components cooperate to form the required fluid flow path between adjacent units in the adjacent frames.

The apparatus may include any required number of frames to permit any required maximum unit-supporting capacity to be achieved. The frames need not all have the same capacity; i.e., they may be of different sizes for carrying different numbers of units.

In preferred embodiments of the apparatus there is at least one said pair of co-operating insert components which are insertable into operative positions from the insides of the or a said pair of frames through peripheral openings thereof, said insert components having inner end flanges which provide said sealing faces for co-operating with sealing faces of said fluid control and/or conditioning units in such frames. In such embodiments the maximum area of the sealing faces on the insert components is not limited by the sizes of the peripheral frame openings through which the components are inserted. The said sealing faces are preferably inclined depthwise of the frames to permit units with similarly inclined cooperating sealing faces to be held tightly in said frames by wedge action. In that way a very efficient sealing of the units within the frames can be easily attained and the units can be quickly removed and replaced when required.

In particularly important forms of apparatus according to the invention, the co-operating insert components and the frames are formed so that when said insert components are in operative positions the frames can abut one against the other. In that case a combination of frames can be installed without taking up more space than would be occupied by a single large frame having the same unit-carrying capacity.

The apparatus may include means for clamping the frames together thereby to form an integral frame structure which can be handled and installed as a unit. If the frames are not adapted to be thus clamped together by clamping means they may be held together by securing them to a common panel or other support structure.

Preferably the insert components of the or a said pair of such components plug one into another. By arranging the components to interengage in that way fluid-tight sealing of the fluid path between adjacent units in the different frames can be easily ensured.

Preferably the apparatus includes means whereby the or a said pair of co-operating insert components can be locked in position in the or a said pair of frames, and means is provided for clamping such frames together and thereby holding such co-operating components in co-operating relationship. Assembly of the frames is thereby greatly facilitated. By way of example, the said locking means may comprise locking pins which are insertable through holes in the frames and which when so inserted engage the insert components to prevent their withdrawal from the frame openings in which they are located.

Advantageously there is at least one said pair of frames having holes which are located in peripheral wall portions thereof and through which clamping bolts for clamping the frames one against the other can be located without obstructing the movement of fluid control and/or conditioning units into said frames. Interconnection of frames can thus be brought about without using external connectors which may obstruct mounting of the apparatus in a required manner on a support panel. In a particular embodiment, said peripheral wall portions are formed on the inside faces thereof with recesses or channels for accommodating nut members and holding them against rotation during screwing of said bolts therethrough. The interconnection of frames is thereby further facilitated.

Preferably, apparatus according to the present invention also includes at least one insert component (hereafter called "end connector") for connection to a conduit of the fluid line, which end connector is insertable through a peripheral opening of either frame of the or a said pair of frames and which likewise has a sealing face for co-operating with a sealing face of a fluid control and/or conditioning unit in such frame, said end connnector having a threaded tubular portion for connection to a said conduit. The different openings of a given frame may be fitted with one such end connector and one insert component for co-operating with an insert component of an adjacent frame. Alternatively a said frame may be used on its own by fitting both of its said openings with such threaded end connectors to permit coupling to fluid conduits at both ends.

A specific embodiment of the invention, selected by way of example, is illustrated in the accompanying drawings in which:

FIG. 1 is a plan view of assembled apparatus according to the invention;

FIG. 2 is an elevation of the apparatus, partly in cross-section on line II—II in FIG. 1, together with a typical retaining ring as used for retaining a fluid control and/or conditioning unit in position in the apparatus;

FIG. 3 is an under-plan view of part of the said apparatus;

FIG. 7 is a cross-sectional view of a modification of part of the apparatus; and FIG. 8 is an end view of the modification shown in FIG. 7.

Figure 4:
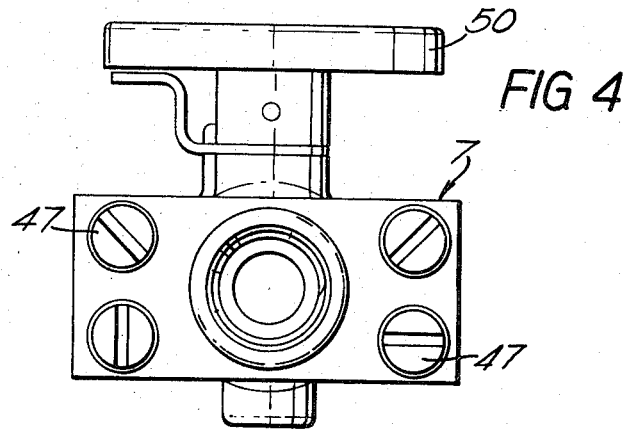
FIG. 4 is an end view of a valve unit which is associated with the apparatus.
Figure 5:
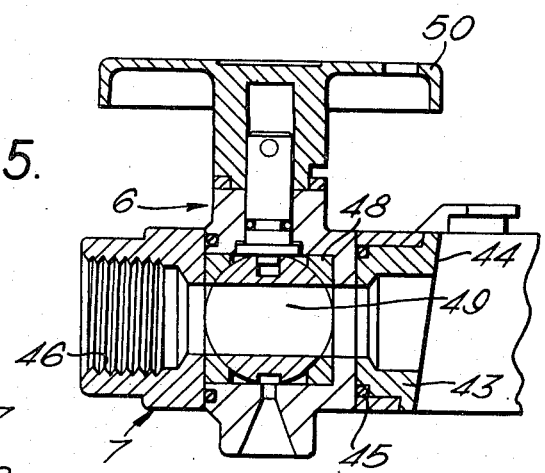
FIG. 5 is a cross-sectional view of this valve unit, at right angles to FIG. 4.

The apparatus represented in FIGS. 1 to 5 comprises two frames 1 and 2 for supporting fluid control and/or conditioning units. Frame 1 is formed with two spaced apertures 3 and 4 for receiving two such units. Frame 2 provides a single unit-receiving aperture 5. At the left hand end of frame 1 there is a valve unit 6 which is located between frame 1 and an end connector 7. An opposite end connector 8 projects from the right hand end of frame 2. The end connector 7, the valve unit 6, the frame 1 and the frame 2 with its end connector 8 are clamped together to form a unitary assembly.

As will be described in more detail hereafter, the frame apertures 3, 4 and 5 communicate via fluid flow paths which register with inlet and outlet ports in the fluid control and/or conditioning units when these are in place in the frames. Fluid conduits (not shown) can be connected to the assembly via the end connectors 7 and 8 to permit fluid under pressure to be passed through the control and/or conditioning units in series, the flow being capable of being shut off by the valve unit 6.

The apertures 3 and 4 in frame 1 communicate via a passage 9 within the central part of the frame. A passage 10 extends between aperture 3 and the adjacent end face of such frame. A similar passage 11 extends between aperture 4 and the other end face of the frame. The aperture 5 in frame 2 is in communication with the end faces of that frame via passages 12 and 13.

According to the invention, a pair of co-operating insert components 14, 15 is provided for forming a fluid flow path between a fluid control and/or conditioning unit located in frame aperture 4 in frame 1 and another such unit located in aperture 5 of frame 2. Insert component 14 comprises an inner end flange 16 and is insertable through the passage 11 from the inside of frame 1. When fully inserted the insert flange 16 abuts against an inner face portion of the frame. The insert component 15 is likewise provided with an inner end flange 17 which limits the movement of the component when it is inserted through passage 12 from the inside of frame 2. The bores of the insert components 14, 15 are internally stepped to provide opposed sealing faces between which there is located a sealing ring 18.

It will be noted that the presence of the insert components 14, 15, plugged one into the other, does not prevent the frames 1 and 2 from abutting one against the other. In fact the frames are clamped in this abutting relationship by bolts 19, 20 which co-operate with nuts 21, 22 respectively. The said bolts extend through holes in peripheral wall portions of the frames 1 and 2, such wall portions being outside the plan contour of the frame apertures 4 and 5 so as not to obstruct the insertion of fluid control and/or conditioning units into such frame apertures.

The end wall of frame 2 opposite the bolts 19, 20 is formed with openings 23, 24 (FIG. 3) through which a screw-driver shank can be inserted for tightening the bolts 19, 20. During tightening of the bolts, the nut members 21, 22 are prevented from rotating by virtue of their being located in channels 25, 26 defined by internal surface portions of the frame 1. Each of the frames is formed with such bolt holes and internal nut-locating channels at each end so that the frames are reversible and additional frames can be connected to either or both of them so as to extend the assembly for accommodating additional fluid control and/or conditioning units.

The inner end flanges 16 and 17 of the insert components 14, 15 provide sealing faces 27, 28 for sealing against co-operating sealing faces on the fluid control and/or conditioning units to be received in the frame apertures 4, 5. The sealing faces 27, 28 converge depthwise of the assembled frames. This inclination of the sealing faces 27, 28 contributes to permit control and/or conditioning units to be held firmly in the frames by wedge action as will hereafter be described.

The frame 1 is internally shaped to provide spaced parallel ribs 29, 30 between which the flange 16 of the insert component 14 is located when the insert is in operative position. The frame 2 is similarly formed with internal ribs 31, 32 for locating the flange 17 of the insert component 15. The extent of inward projection of the said ribs in such that the channels between them can receive not only the insert component flanges but also portions of the fluid control and/or conditioning units so that the latter are correctly located.

As has already been mentioned the opposed ends of each frame are similarly shaped so that other like frames can be connected to them at either end of the assembly. Consequently there are locating ribs 33, 34 in what in the illustrated assembly is the outer end portion of frame 2, and similar internal ribs (not shown) are present in the end portion of frame 1 which is connected to the valve unit 6. The central portion of frame 1, between frame apertures 3 and 4, is formed with ribs defining a channel with a bottom inclined sealing face 37 for co-operating with a unit to be installed in frame aperture 4, and with ribs 38–39 defining a channel with a bottom inclined sealing face 40 for co-operating with a unit to be installed in frame aperture 3.

The end connector 8 is in the form of an insert component which is inserted through passage 13 from the inside of frame 2 and has an inner end flange 41 which is located between the ribs 33–34 and provides an inclined sealing face opposing the inclined sealing face formed by the insert component 15 on the other side of the frame aperture 5. The end connector 8 has an internally screw-threaded bore 42 for connection to a fluid supply or delivery line.

A further insert component 43 (FIGS. 2 and 5) is inserted through the passage 10 of frame 1 from the inside of such frame and provides an inclined sealing face 44 opposing the sealing face 40 on the opposite side of frame aperture 3. The component 43 is of such length that when in position its outer end is flush with the corresponding end face of the frame 1. The outer end of the said component is of reduced diameter to provide for the accommodation of a sealing ring 45 for sealing against the abutting face of the valve unit 6. The end connector 7, which has a threaded bore 46 for connection to a fluid supply or delivery line, has bolt holes 47 through which bolts such as 47 extend, the bolts passing through registering holes in the valve unit 6 and in the adjacent end wall of frame 1 and being anchored by nuts located in nut-locating channels as before referred to.

The valve unit 6 has a rotatable valve body 48 having a through-bore 49 which can be turned through 90° by means of the cap 50 to shut-off the fluid path through the system.

Figure 6:
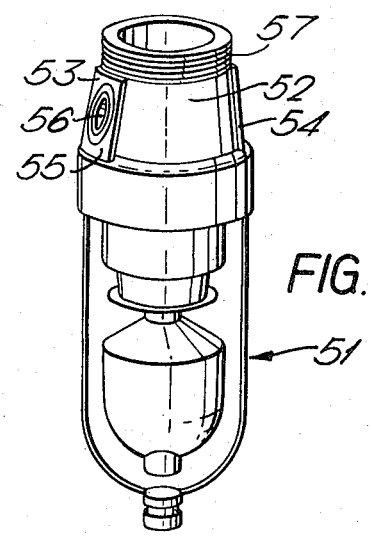
FIG. 6 shows a fluid control unit which can be supported in the apparatus.

The frame 1 and 2 are adapted to receive fluid control and/or conditioning units having inlet and outlet ports which become sealed in register with the fluid passages through the frames when the units are installed therein. A typical unit is shown in FIG. 6. This unit, which is an air filter and is designated 51, has a plug portion 52 having diametrically opposed rectangular projections 53, 54. These projections provide diametrically opposed flat sealing faces such as 55. The sealing faces lie in planes which in the aspect of FIG. 6 are upwardly convergent towards the axis of the unit. The fluid inlet and outlet ports of the unit open into such sealing faces. One of these ports appears in FIG. 6 and is designated 56. An upper end section 57 of the plug portion 54 is externally screw-threaded.

The unit 51 can be installed in any of the three frame apertures 3, 4 and 5 of the supporting and connecting apparatus. To this end the plug portion 52 of the unit is inserted through the selected frame aperture from the side thereof at which its sealing faces have the wider spacing. With the assembly in the orientation represented in FIG. 2 the unit is inserted upwardly through the selected frame aperture. Let it be assumed for example that the unit is to be installed in aperture 4 of frame 1. The unit is orientated about its axis so that its rectangular projections 53, 54 pass between the pairs of locating ribs 29–30 and 35–36. Due to the upward convergency of the sealing faces on the unit and of the sealing faces in the frame the unit plugs into the frame with a wedge action. The aforesaid locating ribs ensure that the fluid inlet and outlet ports of the unit move into register with the fluid passages 9 and 11 in the frame where such passages open into the sealing faces 27 and 37.

The unit 51 is anchored in the frame by a retaining ring 58 (FIG. 2) which makes screw-threaded engagement with the end section 57 of the unit. After the said end section 57 has entered the retaining ring, the ring is rotated to draw the unit 51 into its final position. In FIG. 2 the retaining ring 58 is shown spaced from the frame. In actual fact the ring is held captive against the top of the frame by a pair of lugs 59 which are diametrically opposed with respect to the frame aperture 4 and engage over the rim 60 of the ring. Due to the retaining ring being held captive, unscrewing motion thereof will cause the unit 51 to be pushed out of position in the frame. If a workman should start to unscrew the ring while the system is in use, with the valve unit 6 in open position, there will be an audible escape of air by way of warning. Friction hang-up of the unit in the frame therefore cannot occur. This is an important safety factor.

Similar retaining lugs are provided adjacent the other frame apertures for retaining similar retaining rings for anchoring other units.

The fluid-line connector 8 may for example be replaced by an insert component 61 and end connector 62 as shown in FIGS. 7 and 8. The component 61 has a reduced end portion providing accommodation for a sealing ring 63 for sealing against an end face of the connector 62 when this is secured against the frame 1.

The connector 62 is so secured by bolts such as 64 which are passed through the end connector 62 and through holes in the adjacent end wall of the frame 1 for co-operating with nut members (not shown) located in the nut-locating channels within such frame. The end connector 62 is provided with a screw-threaded bore 65 for connection to a fluid supply or delivery line.

The insert components may be held in position by the pressure exerted thereon by the fluid control and/or conditioning units when they are installed in the frames. Preferably however the frames are provided with holes such as 66, 67 and 68, 69 through which retaining pins can be tapped for retaining the insert components in position. Such pins can, e.g., enter sockets or recesses in said insert components.

By way of modification of the illustrated embodiment, insert components 14, 15 could be replaced by insert components which plug one into another but have tapered co-operating sealing faces which seal together under wedge action.

Although the invention has been illustrated by co-operating insert components such as 14, 15 which plug one into the other, the insert components providing a fluid path between adjacent units in adjacent frames could co-operate by endwise abutment, if required through the intermediary of a sealing ring.

It will be appreciated that the apparatus is highly adaptable to different systems. For example if the frame 2 and associated unit is not required for a given installation, they can be removed and the insert component 14 can be replaced by an insert component like the end connector 8 having a screw-threaded bore for direct connection to a fluid supply or delivery line. As another example of adaptation, the end connectors 7 and 8 can be removed and replaced by similar connectors having however screw-threaded bores of different diameters to suit different air line diameters.

What is claimed is:

1. In apparatus for supporting and connecting fluid control and/or conditioning units to permit flow of fluid through such units in series wherein said apparatus includes at least one pair of frames each capable of supporting at least one of said units in a position so that fluid inlet and outlet ports of each said unit are within the frame, each of said frames having local peripheral openings via which fluid can flow to and from a unit located in said frame, the improvement comprising:
   at least one pair of tubular insert components which are insertable through two of said peripheral openings, one in one frame and one in the other frame, said insert components having:
   sealing faces for co-operating with sealing faces of said units in said frames; and
   co-operating means to provide a fluid path from a unit in one frame to a unit in the other frame.

2. The improvement as defined in claim 1, wherein:
said pair of insert components are insertable into operative position from the insides of said pair of frames through said peripheral openings thereof, said insert components having inner end flanges which provide said sealing faces for co-operating with sealing faces of said units in said frames.

3. The improvement as defined in claim 2, wherein:
said sealing faces provided by said inner end flanges are inclined depthwise of said frames so that units with similarly inclined co-operating sealing faces can be held tightly in said frames by wedge action.

4. The improvement as defined in claim 1, wherein:
said co-operating insert components and the frames are formed so that when said co-operating means of said insert components are in engagement said frames abut one against the other.

5. The improvement as defined in claim 1, wherein:
said co-operating means of said components are engagable with one into another.

6. The improvement as defined in claim 1, wherein:
means is provided to lock said pair of co-operating insert components in said pair of frames; and
means is provided for clamping said frames together to hold said co-operating insert components in engagement.

7. The improvement as defined in claim 6, wherein said frames have peripheral wall portions and further including:
holes in at least one said pair of frames located in said peripheral wall portions; and
clamping bolts for clamping the frames one against the other extendable through said holes without obstructing the movement of said units into said frames.

8. The improvement as defined in claim 7, wherein:
said peripheral wall portions are formed on the inside faces thereof with recesses or channels for accommodating nut members and holding them against rotation during screwing of said bolts therethrough.

9. The improvement as defined in claim 1, further including:
an end connector insertable through a second peripheral opening of either of said frames and which likewise has a sealing face for co-operating with a sealing face of said unit in said frame, said end connector having a threaded tubular portion for connection to a fluid conduit.

* * * * *